United States Patent
Krause

(10) Patent No.: US 8,938,314 B2
(45) Date of Patent: Jan. 20, 2015

(54) SMART ENERGY CONSUMPTION MANAGEMENT

(75) Inventor: Rainer K. Krause, Kostheim (DE)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 13/270,830

(22) Filed: Oct. 11, 2011

(65) Prior Publication Data

US 2012/0123600 A1 May 17, 2012

(30) Foreign Application Priority Data

Nov. 16, 2010 (EP) .................................... 10191376

(51) Int. Cl.

| | |
|---|---|
| G05B 13/02 | (2006.01) |
| G06F 19/00 | (2011.01) |
| G06F 7/00 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 15/02 | (2006.01) |

(52) U.S. Cl.
CPC ...... *G05B 15/02* (2013.01); *G05B 2219/32021* (2013.01); *G05B 2219/35215* (2013.01)
USPC .................. 700/99; 700/28; 700/32; 700/36; 700/108; 700/111; 700/121; 700/213; 700/291

(58) Field of Classification Search
CPC ........... G06Q 10/103; G06Q 10/06313; G05B 13/024; G05B 2219/45031; G05B 2219/45213; G05B 19/4187; G05B 19/41885

USPC ......... 700/28, 32, 36, 99, 108, 111, 121, 213, 700/291

See application file for complete search history.

(56) References Cited

U.S. PATENT DOCUMENTS

| | | | |
|---|---|---|---|
| 5,148,370 A | 9/1992 | Litt et al. | |
| 5,946,677 A * | 8/1999 | Bullen | 707/700 |
| 6,408,220 B1 * | 6/2002 | Nulman | 700/121 |
| 6,495,981 B2 * | 12/2002 | Romanowich et al. | 318/434 |
| 7,586,279 B2 * | 9/2009 | Theunissen et al. | 318/466 |
| 7,650,199 B1 * | 1/2010 | Kadosh | 700/121 |
| 7,693,687 B2 * | 4/2010 | Lev-Ami et al. | 702/186 |
| 8,014,991 B2 * | 9/2011 | Mitrovic et al. | 703/13 |
| 8,634,949 B2 * | 1/2014 | Barker et al. | 700/99 |
| 2004/0225413 A1 | 11/2004 | Miyashita et al. | |

(Continued)

*Primary Examiner* — Ronald Hartman, Jr.

(74) *Attorney, Agent, or Firm* — Cantor Colburn LLP; Ingrid Foerester

(57) ABSTRACT

A method for optimizing energy efficiency in a manufacturing process includes monitoring power consumption of each of a plurality of manufacturing entities of the manufacturing process using a power metering device assigned thereto; collecting, from the power metering devices, a first data stream that includes information about the power consumption; collecting a second data stream that includes information about the manufacturing entity and process; determining an optimized product routing of products to be manufactured by the manufacturing process from one manufacturing entity to another manufacturing entity, based on the collected first and second data streams, by simulating different product routings and determining the optimal product routing with respect to the overall energy consumption of the manufacturing process; and adjusting, via a manufacturing control system, the manufacturing process based on the optimized product routing.

18 Claims, 3 Drawing Sheets

(56) References Cited

U.S. PATENT DOCUMENTS

| | | |
|---|---|---|
| 2007/0262847 A1* | 11/2007 | Grabinger et al. ............. 340/3.1 |
| 2008/0051024 A1* | 2/2008 | Caliendo et al. ............. 454/369 |
| 2009/0177505 A1 | 7/2009 | Dietrich et al. |
| 2009/0281677 A1 | 11/2009 | Botich et al. |
| 2010/0168897 A1 | 7/2010 | August et al. |
| 2011/0288668 A1* | 11/2011 | Barker et al. ................. 700/100 |

* cited by examiner

SMART ENERGY CONSUMPTION MANAGEMENT

PRIORITY

This application claims priority to European Patent Application No. 10191376.2, filed 16 Nov. 2010, and all the benefits accruing therefrom under 35 U.S.C. §119, the contents of which in its entirety are herein incorporated by reference.

BACKGROUND

The present invention relates to a method and a system for managing the energy consumption in a manufacturing process. More specifically, the present invention relates to a method and a system for managing the energy consumption in a manufacturing process comprising a plurality of individual manufacturing entities.

Energy consumption is getting more and more critical within manufacturing environments and can no longer be buried within the facility cost. With further increasing energy cost there must be a new way to introduce this significant factor into the manufacturing and total cost of ownership (TCO) calculations. Energy, therefore, is becoming more and more of a product cost factor which has to be considered. The problem is to monitor energy consumption down to highest granularity.

In the actual production approach, production is calculated as a function of the variables forecast, demand, capacity, WIP, facility, yield, lead time, supply, maintenance, priorities, etc. However, energy consumption is not considered in the manufacturing planning, at least not in the high granularity down to the single equipment level. To make manufacturing planning more feasible with respect to the total costs, energy consumption of the manufacturing process has to be considered down to each individual manufacturing entity.

Published patent application US20100168897 discloses a control component and method for an energy management unit (EM) in an industrial automation arrangement which is configured to control one of a process, a subprocess and a system part of the industrial automation arrangement. Here, the control component is configured to detect the energy consumption of at least one part of the industrial automation arrangement, and the control component is configured to relate the detected energy consumption to at least one stored specification. The control component is also configured to generate a request for at least one automation component as the result of the relating operation. The control component is configured to transmit a message containing the request to the automation component and to receive an acknowledgement message from this automation component, where the request is directed to changing an operational state of one of the process, subprocess and system part that is controlled by the automation component.

Published patent application US20040225413 discloses an energy evaluation support system and the like which can more efficiently and precisely compute electric power consumption for each of predetermined processing units such as production steps and the like. The energy evaluation support system includes a receiving section which receives a factory design request including a production condition instruction indicating a production condition from the user, a storage section which stores a production device database containing data relating to production devices and a requisite-power supply device database containing data relating to requisite-power supply devices, a processing section which computes energy consumption for each of the production devices and the requisite-power supply devices and for each requisite power type, based on the production device database and requisite-power supply device database according to the factory design request from the user, and an output section which presents the energy consumption computed by the processing section to the user in a predetermined form.

U.S. Pat. No. 5,148,370 discloses a method employed by an expert system for batch scheduling the multiple-pass manufacture of a plurality of parts by at least one parts process, where the parts have a plurality of delivery dates and the parts and parts processor have a plurality of production constraints variable during manufacture, which includes creating a knowledge base of select characteristics of the parts processor and parameters of the parts, and generating a plurality of rules expressing a scheduling and planning strategy that substantially satisfies parts delivery dates, substantially maximizes use of the parts processor, substantially maximizes part throughput, substantially minimizes energy utilization of the parts processor and meets the production constraints. Parts suitable for simultaneous processing by the parts processor are combined into all possible preferred combinations by applying a first plurality of the rules to the knowledge base. Preferred combinations are scheduled for manufacture in batches by applying a second plurality of the rules to the knowledge base.

Published patent application US20090177505 discloses the modeling of a carbon footprint of a supply and distribution chain as a carbon dioxide ($CO_2$) cost that can be considered alongside monetary or dollar costs in supply, manufacturing, and distribution operations. Databases on products and services, supply chain policies, and targets, costs, and/or greenhouse gas (GHG) emissions are used by a GHG calculator to output carbon footprint data and/or by a supply chain optimizer to output supply chain planning and policy data. Client computers obtain carbon footprint and/or supply chain planning and policy data by querying a server with access to a database storing calculated carbon footprint data. Input data to the GHG calculator is updated based on choices made by users of the system.

Published patent application US20090281677 discloses systems and methods for assessing and optimizing energy use and environmental impact can be designed to receive energy consumption and emission data from one or more energy consumption sources of a facility over a network. The data can be transformed into a database format that can be processed and analyzed. The data can be validated according to predefined validation rules. The data can be aggregated according to predefined time intervals and stored in memory. The data can be used to generate a report to a user, for example, via a user interface.

SUMMARY

In one embodiment, a method for optimizing energy efficiency in a manufacturing process includes monitoring power consumption of each of a plurality of manufacturing entities of the manufacturing process using a power metering device assigned thereto; collecting, from the power metering devices, a first data stream that includes information about the power consumption; collecting a second data stream that includes information about the manufacturing entity and process; determining an optimized product routing of products to be manufactured by the manufacturing process from one manufacturing entity to another manufacturing entity, based on the collected first and second data streams, by simulating different product routings and determining the optimal product routing with respect to the overall energy consumption of the manufacturing process; and adjusting, via a manufacturing control system, the manufacturing process based on the optimized product routing.

In another embodiment, a system for optimizing the energy efficiency in a manufacturing process includes a power metering device assigned to each of a plurality of manufacturing entities of the manufacturing process; means for collecting data streams including information about the power consumption from the power metering devices and information about the manufacturing entity and process; communication means for transmitting the data streams to a calculation means, the calculation means configured to calculate an optimized product routing of products to be manufactured by the manufacturing process from one manufacturing entity to another manufacturing entity, based on the collected data streams with respect to the overall energy consumption of the manufacturing process; and communication means for transmitting information about the optimized product routing calculated by the calculation means to a manufacturing control system that controls the manufacturing entities.

In another embodiment, a computer program product includes a non-transitory, computer usable medium, having computer readable instructions stored thereon that, when executed by a computer, perform a method for optimizing energy efficiency in a manufacturing process. The method includes monitoring power consumption of each of a plurality of manufacturing entities of the manufacturing process using a power metering device assigned thereto; collecting, from the power metering devices, a first data stream that includes information about the power consumption; collecting a second data stream that includes information about the manufacturing entity and process; determining an optimized product routing of products to be manufactured by the manufacturing process from one manufacturing entity to another manufacturing entity, based on the collected first and second data streams, by simulating different product routings and determining the optimal product routing with respect to the overall energy consumption of the manufacturing process; and adjusting, via a manufacturing control system, the manufacturing process based on the optimized product routing.

BRIEF DESCRIPTION OF THE SEVERAL VIEWS OF THE DRAWINGS

Embodiments of the invention are illustrated in the accompanied figures. These embodiments are merely exemplary, i.e. they are not intended to limit the content and scope of the appended claims.

DETAILED DESCRIPTION

The state of the art lacks methods and systems for optimization the energy consumption of an overall manufacturing process down to each individual manufacturing entity.

Figure 1:
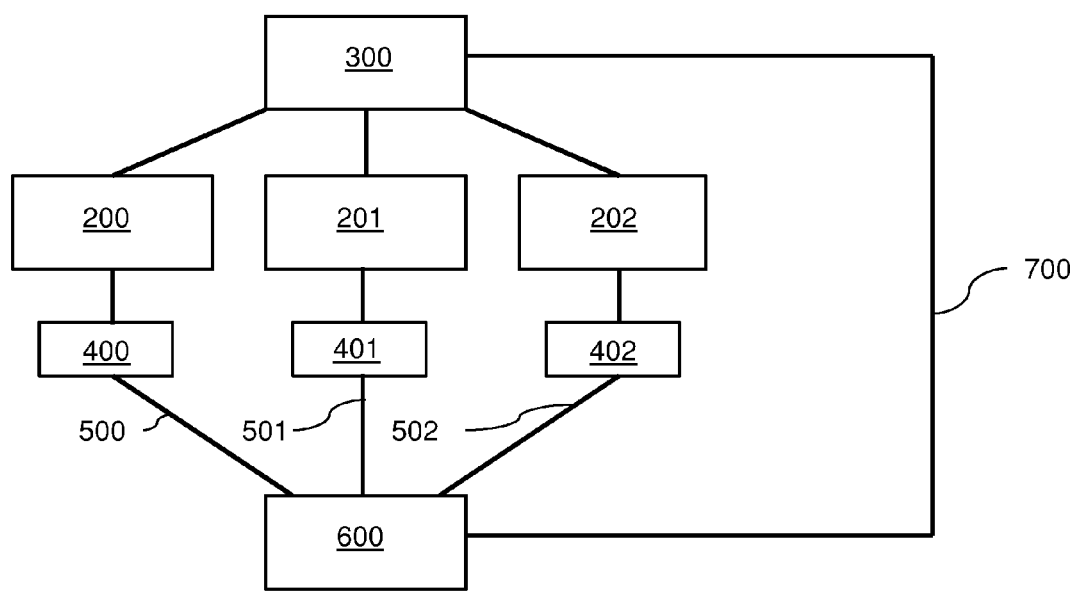
FIG. 1 schematically shows the setup of an inventive system for managing the energy consumption in a manufacturing process.

Referring now to FIG. 1, a plurality of manufacturing entities 200, 201, 202 is shown. Each of these entities 200, 201, 202 may depict a process station in a manufacturing process of a product. The manufacturing entities 200, 201, 202 are connected to individual power metering devices 400, 401, 402, which measure the power consumption of the manufacturing entities 200, 201, 202. The power metering devices 400, 401, 402 are connected to a calculation means 600 by communication means 500, 501, 502 for sending a data stream comprising information about power consumption of the individual manufacturing entities 200, 201, 202 to the calculation means 600. The calculation means is adapted for calculating an optimized product routing of the products to be manufactured by the manufacturing process from one individual manufacturing entity 200, 201, 202 to another individual manufacturing entity 200, 201, 202 based on the collected data streams with respect to the overall energy consumption of the manufacturing process. For example, in entity 200 a base product is pretreated, while entity 201 makes a recess into the product surface and entity 202 drills a hole into the product. While the pretreatment in entity 200 has to be performed as a first manufacturing step, the order of the manufacturing steps of making the recess and drilling the hole may be interchangeable. If the hole has to be drilled in the area were entity 201 has made the recess, making the recess first may be favorable in terms of energy consumption since less material has to be bored out in the drilling step performed by entity 202. However, depending on the product it may be favorable to drill the hole first and to make the recess subsequent since a plurality of drilled intermediate products can be aligned in a row and the entity 201 for making the recess, like, e.g., a rotary cutter, has to be started only. This may be favorable since the energy consumed by the starting current of the rotary cutter is reduced. The best order of product steps can be calculated by the calculation means 600 based on the information received from the power metering devices. The calculation means 600 is connected to a manufacturing control system 300 via a communication means 700. The manufacturing control system 300 controls the individual manufacturing entities 200, 201, 202 and is capable to influence the order of the manufacturing steps. The calculation means 600 sends information about the best order of manufacturing steps in terms of energy consumption to the manufacturing control system 300, which amends the overall manufacturing process according to information received by the calculation means 600.

Figure 2:
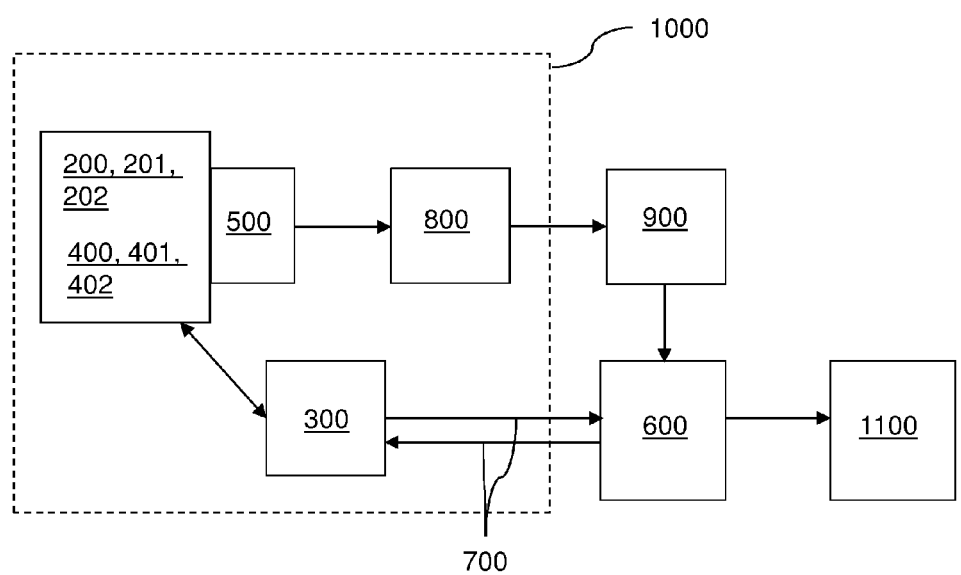
FIG. 2 schematically shows an inventive system with a calculation which is connected to the manufacturing facility via a public network.

Referring now to FIG. 2, in a manufacturing facility 1000, a plurality of individual manufacturing entities 200, 201, 202 are provided. Each of the individual manufacturing entities 200, 201, 202 is connected to a power metering device 400, 401, 402. Via a communication means 500, the power metering devices 400, 401, 402 send information about the power consumption of the manufacturing entities 200, 201, 202 to a database 800 located onside the manufacturing facility. Via a packet-switched data network 900, like the Internet, the database 800 sends a data stream comprising information about the power consumption of the manufacturing entities 200, 201, 202 to the calculation means 600. Via communication means 700, the calculation means 600 is connected to a manufacturing control system 300. The manufacturing control system 300 controls the individual manufacturing entities 200, 201, 202. Based on the information received from the calculation means 600, the manufacturing control system 300 amends the overall manufacturing process to minimize the energy consumption, for example, by interchanging the order of the manufacturing steps performed by manufacturing entities 200, 201, 202. The data calculated by the calculating means 600 can be stored together with the data about the power consumption in a storage databank system 1100.

Figure 3:
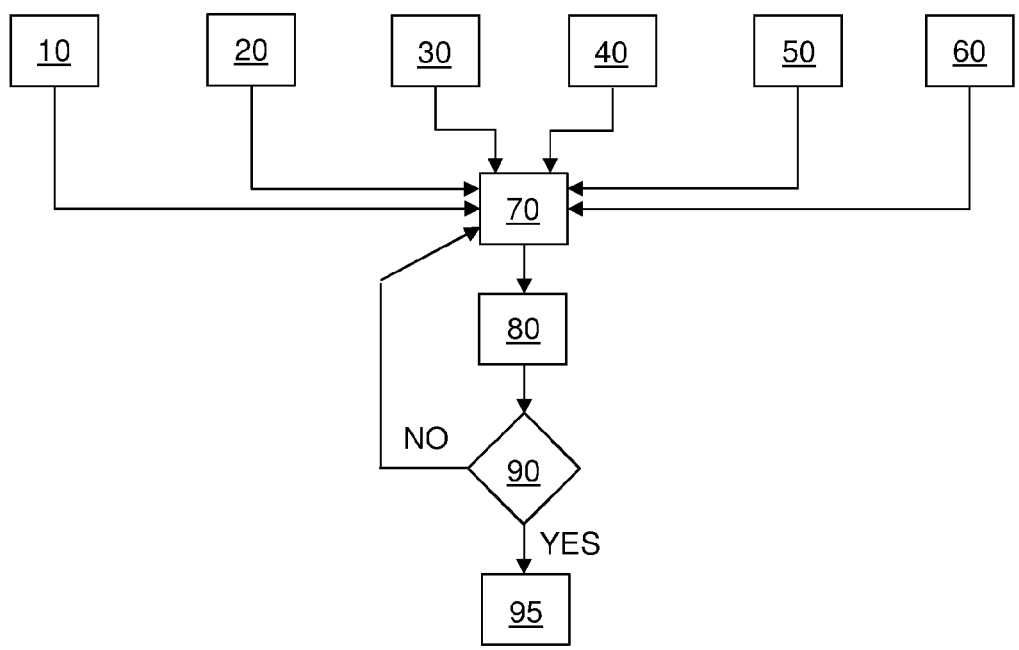
FIG. 3 shows an algorithm flow to determine an optimized energy consumption.

In FIG. 3, an example of an algorithm flow to determine the best energy consumption in a manufacturing facility is shown. Beneath information 60 about the energy consumption, information 10 about the demand or forecast of the production, information 20 about the equipment availability, information 30 about the facility constrains, information 40 about the dependency of the individual manufacturing entities, and information 50 about the volume planning of the production is taken into consideration for optimization 70 of the product routing. Based on the product routing 70, the related costs 80 are estimated. In a decision step 90 it is considered whether the chosen product routing is the optimal one or not. If not, product routing is amended iteratively until the optimized product routing is achieved. Based on the calculated optimized routing the process parameters 95 are amended to perform the manufacturing according to the optimized product routing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An individual manufacturing entity in that concern should be understood as a process station, a single machine or also a part of a machine in the manufacturing process.

With the invention a method is provided which enables the optimization of the energy consumption within a manufacturing process with a high granularity down to the individual manufacturing entities. This gives the opportunity to optimize the overall manufacturing process with respect to the energy consumption without the need to make major constructional amendments to the manufacturing facility. The method enables an optimization also within a running manufacturing process, thereby offering the opportunity to address recent changes, like, e.g., changes in the base product or a change of a manufacturing tool. Also downtimes of an individual manufacturing entity due to maintenance can be considered and the product routing within the manufacturing process can be changed to minimize the influence of this downtime on the overall energy consumption of the manufacturing process.

In an embodiment of the invention, the simulation and optimization of the product routing is performed by a business intelligence system (BI). Such BI systems are commonly used in the art of manufacturing process controlling. To enable such BI systems to perform the simulation and optimization adequate subroutines can be added or implemented. So, the costs for integrating the inventive method to a manufacturing facility can be kept low.

In another embodiment of the invention, additionally a data stream comprising information about at least one of the product demand and the product forecast is collected and taken into consideration for creating an optimized product routing. The consideration of such additional data enables to optimize the process routing also with a predictive horizon.

Yet in another embodiment of the invention, the information about the power consumption of the individual manufacturing entities is collected in database system onside the manufacturing facility. This allows to collect the data retrieved from the power metering devices centrally and to send them as a data package to a BI system.

According to an embodiment of the invention, the information about the power consumption of the individual manufacturing entities is transmitted from the power metering device to the database system onside the manufacturing facility by one of wireless communication and a local area network (LAN).

According to another embodiment of the invention, the collected information about the power consumption of the individual manufacturing entities is transmitted to a BI system via a packet-switched data network. Here, especially public TCP/IP based data network like the internet can be used for transferring the data from the power metering devices to the BI system, either directly or via a database system onside the manufacturing facility, as described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A method for optimizing energy efficiency in a manufacturing process, the method comprising:
   monitoring power consumption of each of a plurality of manufacturing entities of the manufacturing process using a power metering device assigned thereto;
   collecting, from the power metering devices, a first data stream that includes information about the power consumption;
   collecting a second data stream that includes information about the manufacturing entity and process;
   determining an optimized product routing of products to be manufactured by the manufacturing process from one manufacturing entity to another manufacturing entity, based on the collected first and second data streams, by simulating different product routings and determining the optimal product routing with respect to the overall energy consumption of the manufacturing process; and
   adjusting, via a manufacturing control system, the manufacturing process based on the optimized product routing,
   wherein the collected information about the power consumption of the manufacturing entities is transmitted to a business intelligence system via a packet-switched data network.

2. The method according to claim 1, wherein the information about the manufacturing entity and process further comprises volume, and dependency information.

3. The method according to claim 1, wherein the simulation and optimization of the product routing is performed by a business intelligence system.

4. The method according to claim 1, wherein a third data stream including information about at least one of the product demand and the product forecast is collected and taken into consideration for the determining an optimized product routing.

5. The method according to claim 1, wherein the information about the power consumption of the manufacturing entities is collected in a database system on site at the manufacturing facility.

6. The method according to claim 5, wherein the information about the power consumption of the manufacturing entities is transmitted from the power metering device to the database system on site at the manufacturing facility by one of wireless communication and a local area network (LAN).

7. A system for optimizing the energy efficiency in a manufacturing process, the system comprising:
   a power metering device assigned to each of a plurality of manufacturing entities of the manufacturing process;
   means for collecting data streams including information about the power consumption from the power metering devices and includes information about the manufacturing entity and process;
   communication means for transmitting the data streams to a calculation means, the calculation means configured to calculate an optimized product routing of products to be manufactured by the manufacturing process from one manufacturing entity to another manufacturing entity, based on the collected data streams with respect to the overall energy consumption of the manufacturing process; and
   communication means for transmitting information about the optimized product routing calculated by the calculation means to a manufacturing control system that controls the manufacturing entities,
   wherein the power metering devices are connected to a database located on site at the manufacturing facility, the database connected to the calculation means and wherein the database is connected to the calculation means by a packet-switched data network.

8. The system according to claim 7, wherein the information about the manufacturing entity and process further comprises volume, and dependency information.

9. The system according to claim 7, wherein the calculation means is a business intelligence system.

10. The system according to claim 7, wherein the power metering devices are connected to a multiplexer, the multiplexer connected to the calculation means.

11. The system according to claim 7, wherein the power metering devices are connected to a database by one of wireless communication and a local area network (LAN).

12. The system according to claim 11, wherein the database is integrated into the manufacturing control system.

13. A computer program product comprising a non-transitory, computer usable medium, having computer readable instructions stored thereon that, when executed by a computer, perform a method for optimizing energy efficiency in a manufacturing process, the method comprising:
   monitoring power consumption of each of a plurality of manufacturing entities of the manufacturing process using a power metering device assigned thereto;
   collecting, from the power metering devices, a first data stream that includes information about the power consumption;
   collecting a second data stream that includes information about the manufacturing entity and process;
   determining an optimized product routing of products to be manufactured by the manufacturing process from one manufacturing entity to another manufacturing entity, based on the collected first and second data streams, by simulating different product routings and determining the optimal product routing with respect to the overall energy consumption of the manufacturing process; and
   adjusting, via a manufacturing control system, the manufacturing process based on the optimized product routing,
   wherein the collected information about the power consumption of the manufacturing entities is transmitted to a business intelligence system via a packet-switched data network.

14. The computer program product according to claim 13, wherein the information about the manufacturing entity and process further comprises volume, and dependency information.

15. The computer program product according to claim 13, wherein the simulation and optimization of the product routing is performed by a business intelligence system.

16. The computer program product according to claim 13, wherein a third data stream including information about at least one of the product demand and the product forecast is collected and taken into consideration for creating an optimized product routing.

17. The computer program product according to claim 13, wherein the information about the power consumption of the manufacturing entities is collected in database system on site at the manufacturing facility.

18. The computer program product according to claim 16, wherein the information about the power consumption of the manufacturing entities is transmitted from the power metering device to the database system onside the manufacturing facility by one of wireless communication and a local area network (LAN).

* * * * *